United States Patent
Kruglick

(10) Patent No.: US 9,424,060 B2
(45) Date of Patent: Aug. 23, 2016

(54) TIERED EVICTION OF INSTANCES OF EXECUTING PROCESSES

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 181 days.

(21) Appl. No.: 14/239,970

(22) PCT Filed: May 29, 2013

(86) PCT No.: PCT/US2013/043088
§ 371 (c)(1),
(2) Date: Feb. 20, 2014

(87) PCT Pub. No.: WO2014/193361
PCT Pub. Date: Dec. 4, 2014

(65) Prior Publication Data
US 2015/0150002 A1    May 28, 2015

(51) Int. Cl.
G06F 9/455 (2006.01)
G06F 9/50 (2006.01)

(52) U.S. Cl.
CPC ....... *G06F 9/45533* (2013.01); *G06F 9/45558* (2013.01); *G06F 9/5016* (2013.01); *G06F 9/5022* (2013.01); *G06F 9/5077* (2013.01); *G06F 2009/45575* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,046,767 B2 | 10/2011 | Rolia et al. | |
| 8,533,103 B1* | 9/2013 | Certain | G06Q 10/06 705/35 |
| 2005/0060704 A1* | 3/2005 | Bulson | G06F 9/5077 718/1 |
| 2007/0245348 A1* | 10/2007 | Araujo | G06F 21/53 718/1 |
| 2008/0271039 A1* | 10/2008 | Rolia | G06Q 10/06 718/105 |
| 2010/0076805 A1 | 3/2010 | Batsakis et al. | |
| 2011/0173637 A1 | 7/2011 | Brandwine et al. | |
| 2012/0030684 A1* | 2/2012 | Meng | G06F 9/5072 718/104 |
| 2012/0117298 A1 | 5/2012 | Scannell et al. | |
| 2012/0179822 A1 | 7/2012 | Grigsby et al. | |
| 2013/0179895 A1* | 7/2013 | Calder | G06F 9/5077 718/104 |
| 2013/0227710 A1* | 8/2013 | Barak | G06F 21/10 726/29 |
| 2014/0068053 A1* | 3/2014 | Ravi | G06F 9/5072 709/224 |
| 2014/0189685 A1* | 7/2014 | Kripalani | G06F 8/65 718/1 |

OTHER PUBLICATIONS

"Dynamic power capping TCO and best practices white paper," Hewlett-Packard Development Company, pp. 1-15 (2008).

(Continued)

*Primary Examiner* — Dong Kim
(74) *Attorney, Agent, or Firm* — Brundidge & Stanger, P.C.

(57) ABSTRACT

In one example embodiment, an instance of a virtual machine to evict may be identified. A determination may be made within a predetermined range of probabilities, that processing on the identified instance of the virtual machine will resume within a predetermined range of time. Thus, the identified instance of the virtual machine may be softly evicted by allocating processing resources away from the identified instance of the virtual machine, receiving an instruction to resume the processing on the identified instance of the virtual machine, and restoring the processing on the identified instance of the virtual machine.

18 Claims, 4 Drawing Sheets

(56) References Cited

OTHER PUBLICATIONS

"Extensions: Active Energy Manager," IBM accessed at http://web.archive.org/web/20111206043839/http://www-03.ibm.com/systems/management/director/about/director52/extensions/actengmrg.html, accessed on Dec. 26, 2013, pp. 1-2.

"How to Control VMware Virtual Machines from the Command-Line using vmrun," Virtuatopia, accessed at http://web.archive.org/web/20130117232831/http://virtuatopia.com/index.php/How_to_Control_VMware_Virtual_Machines_from_the_Command-Line_using_vmrun, Oct. 30, 2008, pp. 1-3.

"Motivation," accessed at http://web.archive.org/web/20130524113322/http://www.mjmwired.net/kernel/Documentation/vm/cleancache.txt, May 2, 2013, pp. 1-5.

Borkar, S., and Chien, A.A., "The Future of Microprocessors," Communications of the ACM, vol. 54, Issue 5, pp. 67-77 (2011).

Dawoud, W., et al., "Reliable Approach to Sell the Spare Capacity in the Cloud," The Third International Conference on Cloud Computing, GRIDs, and Virtualization, pp. 229-236, IARIA (2012).

Fan, H., et al. "Power Provisioning for a Warehouse-sized Computer," In Proceedings of the ACM International Symposium on Computer Architecture (ISCA), pp. 13-23 (2007).

Femal, M.E., and Freeh, V.W., "Safe overprovisioning: Using Power Limits to Increase Aggregate Throughput," In Workshop on Power-Aware Computer Systems (PACS), Lecture Notes in Computer Science, vol. 3471, pp. 150-164 (2005).

Hamilton, J., "Datacenter Renewable Power Done Right," Perspectives, accessed at http://perspectives.mvdirona.com/, Nov. 30, 2013, pp. 1-33.

Kumari, N., et al., "Cooling Capacity and Cost Metrics for Energy Efficient Workload Placement in Datacenters," Thermal and Thermomechanical Phenomena in Electronic Systems (ITherm), 13th IEEE Intersociety Conference on, pp. 799-805 (2012).

Le, K., et al., "Cost-Aware Virtual Machine Placement in Cloud Computing Systems" pp. 13 (Jan. 2011).

Lefurgy, C., et al., "Server-level power control," Fourth International Conference on Autonomic Computing (ICAC), pp. 10 (2007).

Shi, W., and Hong, B., "Towards Profitable Virtual Machine Placement in the Data Center," Fourth IEEE International Conference on Utility and Cloud Computing (UCC), pp. 138-145 (2011).

Zhang, Q., et al., "Dynamic Resource Allocation for Spot Markets in Clouds," Proceedings of the 11th USENIX conference on Hot topics in management of internet, cloud, and enterprise networks and services, pp. 1-6 (2011).

International Search Report for International Application No. PCT/US2013/043088 mailed on Dec. 5, 2013.

* cited by examiner

TIERED EVICTION OF INSTANCES OF EXECUTING PROCESSES

CROSS-REFERENCE TO RELATED APPLICATION

This Application is the National Stage filing under 35 U.S.C. §371 of PCT Application Ser. No. PCT/US13/43088 filed on May 29, 2013. The disclosure of the PCT Application is hereby incorporated herein by reference in its entirety.

TECHNICAL FIELD

The embodiments described herein pertain generally to an incremental reallocation of resources in a datacenter environment.

BACKGROUND

Unless otherwise indicated herein, the approaches described in this section are not prior art to the claims in this application and are not admitted to be prior art by inclusion in this, section.

Real-time pricing and trading of datacenter resources provide efficient usage of resources and capital opportunity for datacenter owners. However, as users attempt to arbitrage smaller time periods, the churn of swapping out virtual machines consumes increasing proportions of datacenter time. That is, storing and launching large numbers of instances of a virtual machine takes up an increasing amount of time, particularly as storage capacity increases.

SUMMARY

In one example embodiment, a method may include identifying an instance of a virtual machine to evict; determining, within a predetermined range of probabilities, that processing on the identified instance of the virtual machine will resume within a predetermined range of time; softly evicting the identified instance of the virtual machine, including: allocating processing resources away from the identified instance of the virtual machine, receiving an instruction to resume the processing on the identified instance of the virtual machine, and restoring the processing on the identified instance of the virtual machine.

In another example embodiment, a computer-readable medium may store executable-instructions that, when executed, cause one or more processors to perform operations including: identifying an instance of a virtual machine for which processing rights have been lost; determining, within a predetermined range of probabilities, that processing on the identified instance of the virtual machine will resume within a predetermined range of time; and preserving an allotment of RAM, on which the identified instance of the virtual machine was processed, until needed by another process.

In yet another example embodiment, another computer-readable medium may store executable-instructions that, when executed, cause one or more processors to perform operations including: flagging, for reallocation, an allotment of RAM used for a first process; directing processing resources away from the flagged allotment of RAM; reallocating portions of the flagged allotment of RAM for a new process; reconfiguring an entirety of the allotment of RAM upon receiving corresponding Instructions; and restoring the allotment of RAM to full operation for the first process.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
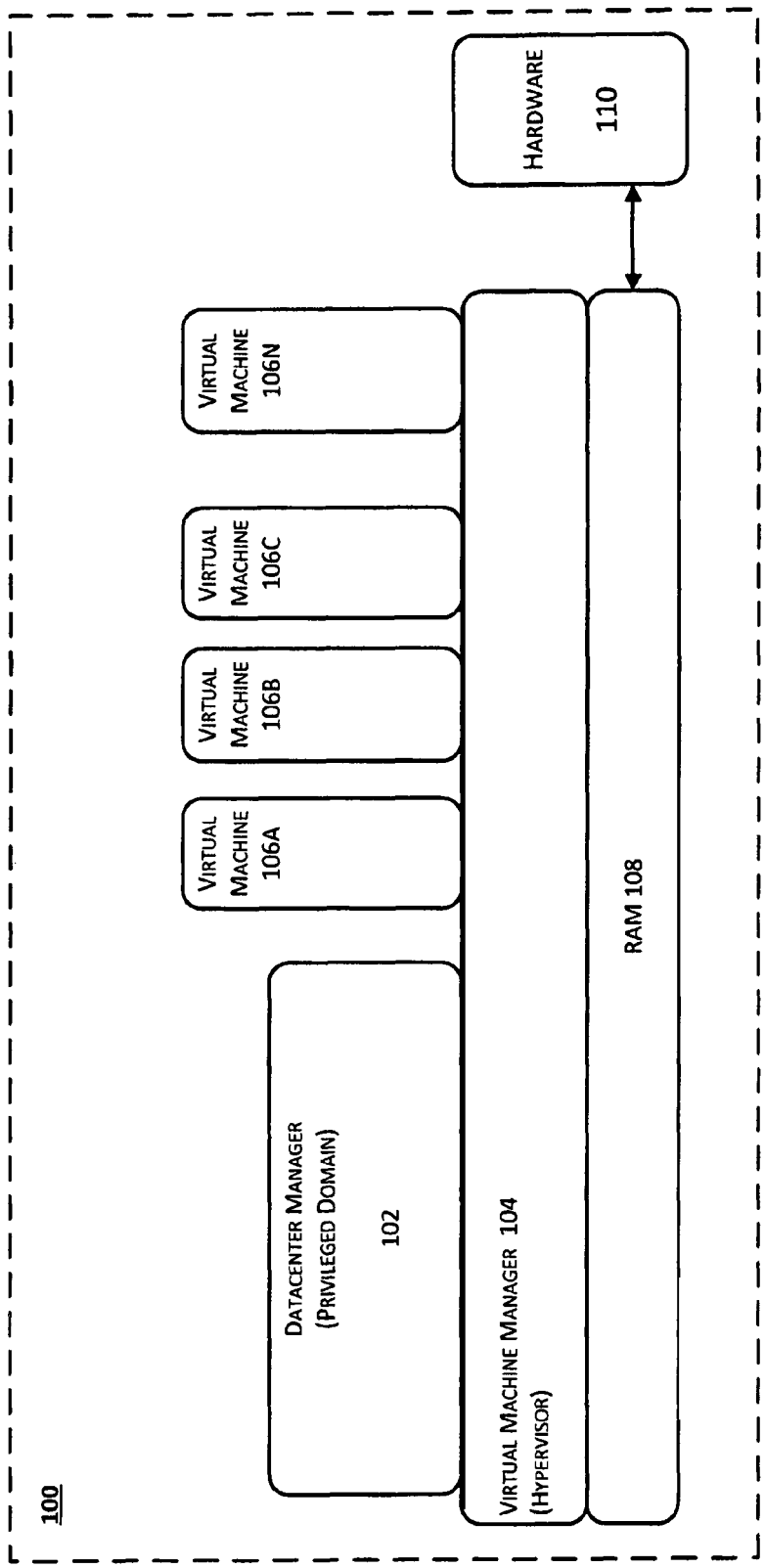
FIG. 1 shows an example system configuration in, which tiered eviction of instances of executing processes may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration 100 in which tiered eviction of instances of executing processes may be implemented, arranged in accordance with at least some embodiments described herein. As depicted, configuration 100 includes, at least, a datacenter manager 102; a virtual machine manager 104; virtual machine instances 106A, 106B, 106C, . . . , 106N; Random Access Memory (hereafter RAM) 108; and hardware 110.

Configuration 100 may pertain to a datacenter, or cloud services platform, of which virtual machines may be rented, leased, or otherwise allocated on a non-permanent time- or task-basis. Thus, consumers may rent, lease, or otherwise be allocated one or more instances of a virtual machine hosted by such a datacenter to run one or more personal applications; and business customers may rent, lease, or otherwise be allocated one or more instances of a virtual machine to run one or more proprietary applications. Configuration 100 may therefore facilitate scalable deployment of applications by providing an online service through which a user may boot a remote image to create a virtual machine, i.e., an instance of a virtual machine that runs the one or more of the aforementioned applications. In the context of configuration 100, a user (also referred to herein as a consumer or a customer) may rent, lease, or otherwise be allocated one or more instances of a virtual machine in accordance with various business models. Non-limiting examples of such business models may include time-based rental of an instance of a virtual machine, e.g., by the minute, hourly, daily, weekly, etc.; or task-based rental of an instance of a virtual machine.

Datacenter manager 102 may refer to a component or module that may be configured, designed, and/or programmed to manage virtual machine instances 106A, 106B, 106C, ..., 106N, which may be rented, leased, or otherwise allocated on a temporary basis. In managing virtual machine instances 106A, 106B, 106C, ..., 106N, datacenter manager 102 may further be configured, designed, and/or programmed to manage some or all aspects of virtual machine instances 106A, 106B, 106C, ..., 106N, including soft evictions as described herein.

For example, one or more components associated with datacenter manager 102 may be configured to identify an instance of a virtual machine to evict; determine, within a predetermined range of probabilities, that processing on the identified instance of the virtual machine will resume within a predetermined range of time; and softly evict the identified instance of the virtual machine by allocating processing resources away from the identified instance of the virtual machine, and restore processing on the identified instance of the virtual machine after receiving an instruction to resume the processing on the identified instance of the virtual machine.

Virtual machine manager 104 may refer to a component or module that is configured, designed, and/or programmed to execute directly on RAM 108 to implement various aspects of tiered eviction of instances of executing processes. Virtual machine manager 104 may be implemented as hardware, software, firmware, or any combinations thereof. In that regard, virtual machine manager 104 may be configured, designed, and/or programmed to interface with one or more requests, from other software modules including virtual machine instances 106A, 106B, 106C, ..., 106N by controlling tables that allow access to RAM 108. Virtual machine manager 104 may or may not be the only component in configuration 100 that has direct access to RAM 108. By separating virtual machine instances 106A, 106B, 106C, ..., 106N from RAM 108, virtual machine manager 104 may be able to execute multiple operating systems securely and independently on each of virtual machine instances 106A, 106B, 106C, ..., 106N, and, further, implement tiered eviction of virtual machine instances 106A, 106B, 106C, ..., 106N independently of each other.

For example, virtual machine manager 104 may be configured to flag, for reallocation, an allotment of RAM 108 used for a first process, direct processing resources away from the flagged allotment of RAM 108, reallocate portions of the flagged allotment of RAM 108 for a new process, reconfigure an entirety of the allotment of RAM 108 upon receiving corresponding instructions, and restore the allotment of RAM 108 to full operation for the first process.

Virtual machine instances 106A, 106B, 106C, ..., 106N may refer to one or more software emulations of physical computing devices, which may be configured to execute consumer- and business-based applications, i.e., software programs, as on local client computing devices. That is, as referenced herein, an instance of a virtual machine may refer to an isolated, partitioned replica of a real server to which full operating system functionality is provided by an operating system kernel. As further referenced herein, instantiate may refer to the launching of a virtual machine.

Virtual machine instances 106A, 106B, 106C, ..., 106N may be instantiated and managed by datacenter manager 102. In some examples, some of virtual machine instances 106A, 106B, 106C, ..., 106N may be configured to execute an independent operating system that is different from other operating systems on other ones of virtual machine instances 106A, 106B, 106C, ..., 106N. Others of virtual machine instances 106A, 106B, 106C, ..., 106N may be configured to execute a single application, i.e., software program, portions of a single application, or a single process. In accordance with some examples, the execution of an application may be separated into different portions and, further, distributed to different ones of virtual machine instances 106A, 106B, 106C, ..., 106N.

Unless context of the present application requires specific attention to a particular one of virtual machine instances 106A, 106B, 106C, ..., 106N, reference may hereafter be made to an instance of virtual machines 106.

RAM 108 may refer to a random access memory (RAM) on which virtual machines 106 may concurrently execute. Portions of RAM 108 may be allocated to one or more instances of virtual machines 106 based on processing needs, in accordance with the business model by which the respective virtual machines are rented, leased, or otherwise allocated to a user. That is, portions of RAM 108 may be dedicated to respective instances of virtual machines 106.

Hardware components 110 may refer to one or more physical elements of configuration 100 that may be commonly shared by one or more of virtual machines 106. Thus, hardware components 110 may include local storage, central processing units (CPUs), network adapters, graphic processing units (GPUs), motherboards, etc., of which resource allocation to one or more instances of virtual machines 106 may be controlled by virtual machine manager 104.

Figure 2:
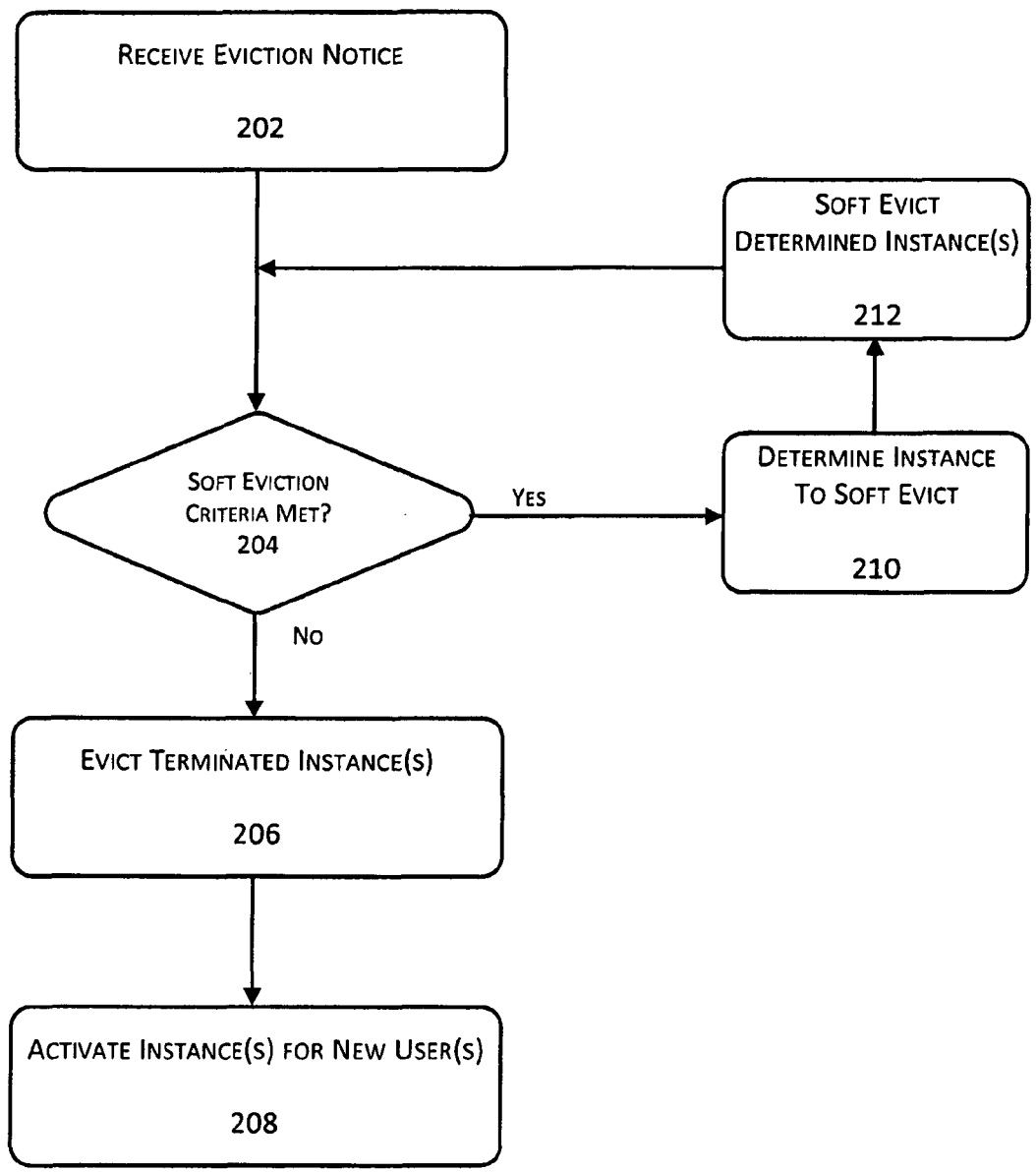
FIG. 2 shows an example processing flow of operations implemented by a data center management layer to tier evict instances of executing processes, arranged in accordance with at least some embodiments described herein.

FIG. 2 shows an example processing flow of operations implemented by a data center management layer to tier evict instances of executing processes, arranged in accordance with at least some embodiments described herein. Processing flow 200 may be implemented by one or both of datacenter manager 102 and virtual machine manager 104. Processing flow 200 may include one or more operations, actions, or functions depicted by one or more blocks 202, 204, 206, 208, 210, and 212. Although illustrated as discrete blocks, various blocks may be divided into additional blocks, combined into fewer blocks, or eliminated, depending on the desired implementation.

Further, as set forth above, configuration 100, and therefore processing flow 200 as well, may pertain to a datacenter, or cloud services platform, of which one or more instances of a virtual machine may be rented, leased, or otherwise allocated on a non-permanent time- or task-basis. Thus, consumers may rent, lease, or otherwise be allocated one or more instances of a virtual machine hosted by such a datacenter to run one or more personal applications; and business customers may rent, lease, or otherwise be allocated one or more virtual machines to run one or more proprietary applications. In the context of processing flow 200, as users lose out on usage of a respective one of virtual machines 106 in, e.g., an auction or other real-time pricing and trading environment, storage and launching of respective ones of virtual machines 106 consumes significant computing resources and time. For example, launching a virtual machine may consume at least one GB of RAM and take over 10 seconds. Thus, processing flow 200 pertains to at least one embodiment of soft eviction by which virtual machine resources for a user who is no longer allocated such resources for one or more of multiple reasons, e.g., lost auction, are revoked incrementally. That is, processing flow 200 pertains to evicting one or more instances of a virtual machine in a tiered fashion. Processing flow 200 may begin at block 202.

Block 202 (Receive Eviction Notice) may refer to datacenter manager 102 receiving one or more notices that user rights to one or more instances of virtual machines 106 are subject to termination. The loss of such rights may be voluntary or forced, e.g., lost auction. Processing flow 200 may proceed from block 202 to decision block 204.

Decision block 204 (Soft Eviction Criteria Met?) may refer to datacenter manager 102 determining whether any of the instances of virtual machine 106, for which the one or more eviction notices were received at block 202, should be subjected to soft eviction. Accordingly, datacenter manager 102 may be configured, designed, and/or programmed to determine whether one or more criteria for soft eviction are met; or datacenter manager 102 may be configured, designed, and/or programmed to receive information to that effect.

Upon a negative determination, i.e., "no," at decision block 204, processing flow 200 may proceed from decision block 204 to block 206. Upon a positive determination, i.e., "yes," at decision block 204, processing flow 200 may proceed from decision block 204 to block 210.

Block 206 (Evict Terminated Instance(s)) may refer to datacenter manager 102, alone or in combination with virtual machine manager 104, shutting down and stowing any instance of virtual machines 106 for which an eviction notice was received at block 202 and, further, the soft eviction criteria were determined to not be met at decision block 204.

Block 208 (Activate Instance(s) for New User(s)) may refer to datacenter manager 102, alone or in combination with virtual machine manager 104, reallocating user rights to the one or more instances of virtual machine 106 that were shut down and stowed at block 206.

Block 210 (Determine Instance to Soft Evict) may refer to datacenter manager 102 determining whether the eviction notice received at block 202 meets one or more criteria to implement soft eviction with regard to the subject instance of virtual machines 106. By some embodiments, datacenter manager 102 may be configured, designed, and/or programmed to determine whether the one or more criteria are met; or datacenter manager 102 may be configured, designed, and/or programmed to receive such information.

As referenced herein, soft eviction may refer to tiered eviction of the subject Instance of virtual machines 106 such that accelerated restoration to operation, i.e., re-instantiation, may be implemented by preserving the subject instance that has been identified as being likely to return to service within a predetermined range of probability. Soft eviction may be contrasted to normal or hard eviction by which the subject instance of virtual machines would be shut down and stowed, or simply turned off, resulting in a loss of current state. Implementations of soft eviction are described in portions of the description that follow.

Block 204 may include datacenter manager 102 determining or being informed of which instance of virtual machines 106, for which the one or more soft eviction criteria were determined to be met at decision block 204, is likely to be re-instantiated within a predetermined range of probability based on, e.g., an acceptable time threshold. Particularly determining or identifying an instance of virtual machines 106 that is likely to be re-instantiated includes receiving an indication that an allotted time for processing on the identified instance of virtual machines 106 has not been extended. The allotted time may be referred to, herein, as an epoch, which may include a completed auction cycle in accordance with a business model by which the datacenter to which configuration 100 corresponds is operated, such as an auction.

Alternatively, decision block 204 may include datacenter manager 102 determining or being informed that, due to observations of physical resources 110, as well as RAM 108, there is an acceptable cost beyond initial investment in management systems for not fully evicting one or more instances of virtual machine 106 for which the one or more soft eviction criteria were determined to be met at decision block 204.

In the context of the description of the remainder of processing flow 200, the one or more instances of virtual machine 106 for which the one or more soft eviction criteria were determined to be met at decision block 204 may be further referred to as the subject instance of virtual machines 106.

As stated previously, in some embodiments, datacenter manager 102 may be configured, designed, and/or programmed to determine or be Informed that user rights to the subject instance of virtual machines 106 had been lost in an auction, or in accordance with some other facet of a business model by which the datacenter to which configuration 100 corresponds is operated. Thus, for example, datacenter manager 102 may determine or be Informed that user rights to the subject instance of virtual machines 106 have been lost by a predetermined threshold amount, e.g., $0.01 per epoch in an auction, or less. As a result, datacenter manager 102 may determine that the user rights to the subject instance of virtual machines 106 may be regained or reacquired in a subsequent epoch, and therefore soft eviction of the subject Instance of virtual machines 106 may be appropriate.

As another example, datacenter manager 102 may determine or be informed that, prior to user rights being lost, the subject instance of virtual machines 106 had been under the control of or otherwise assigned to the user for a predetermined number of consecutive epochs, e.g., three. Thus, datacenter manager 102 may determine that user rights to the subject instance of virtual machines 106 may be regained or reacquired in a subsequent epoch, and therefore soft eviction of the subject instance of virtual machines 106 may be appropriate.

That is, based on the amount of money by which user rights were lost to the subject instance of virtual machines 106 or even based on a history of continued usage by a particular user, it may be determined that the user rights to the subject instance of virtual machines 106 may be regained or reacquired within a predetermined range of probabilities.

As yet another example, datacenter manager 102 may determine or be informed by, e.g., virtual machine manager 104, that a current allocation of RAM 108 and hardware components 110 are sufficient to service currently running instances of virtual machine 106. Thus, datacenter manager 102 may determine that soft eviction of the subject instance of virtual machines 106 may be appropriate since there would be no hardship imposed on any of the currently running instances in terms of lack of resources.

Regardless of the implementation, processing flow 200 may proceed from block 210 to block 212.

Block 212 may refer to datacenter manager 102, alone or in combination with virtual machine manager 104, implementing a tiered eviction, i.e., soft eviction, of the subject instance of virtual machines 106. Block 212 may refer to datacenter manager 102, alone or in combination with virtual machine manager 104, allocating processing resources away from the subject instance of virtual machines 106, and re-instantiating the subject instance of virtual machines 106 upon receiving an instruction to do so.

For example, an allotment of RAM 108, on which processing of the subject instance of virtual machines 106 was executed, may be placed in a removable state. If the allotment of RAM 108 is needed to service another instance of virtual machines 106, block 212 may further include evicting a portion of the allotment of RAM 108 to a local storage included as part of hardware 110. Further, CPU cycles may be withheld from the subject instance of virtual machines 106.

When an instruction is received to re-instantiate, the subject instance of virtual machines 106 may be re-provisioned back from the local storage, and processing may resume on the entirety of the subject instance of virtual machines 106. That is, processing resources that were previously allocated away from the subject instance of virtual machines 106 may then be reallocated thereto.

Processing flow 200 may revert from block 212 back to decision block 204, at which new or remnant eviction notices may be evaluated for compliance with one or more soft eviction criteria. Accordingly, processing flow 200 illustrates a recurring flow of operations by which restoration time for one or more instances of a virtual machine may be significantly hastened.

Figure 3:
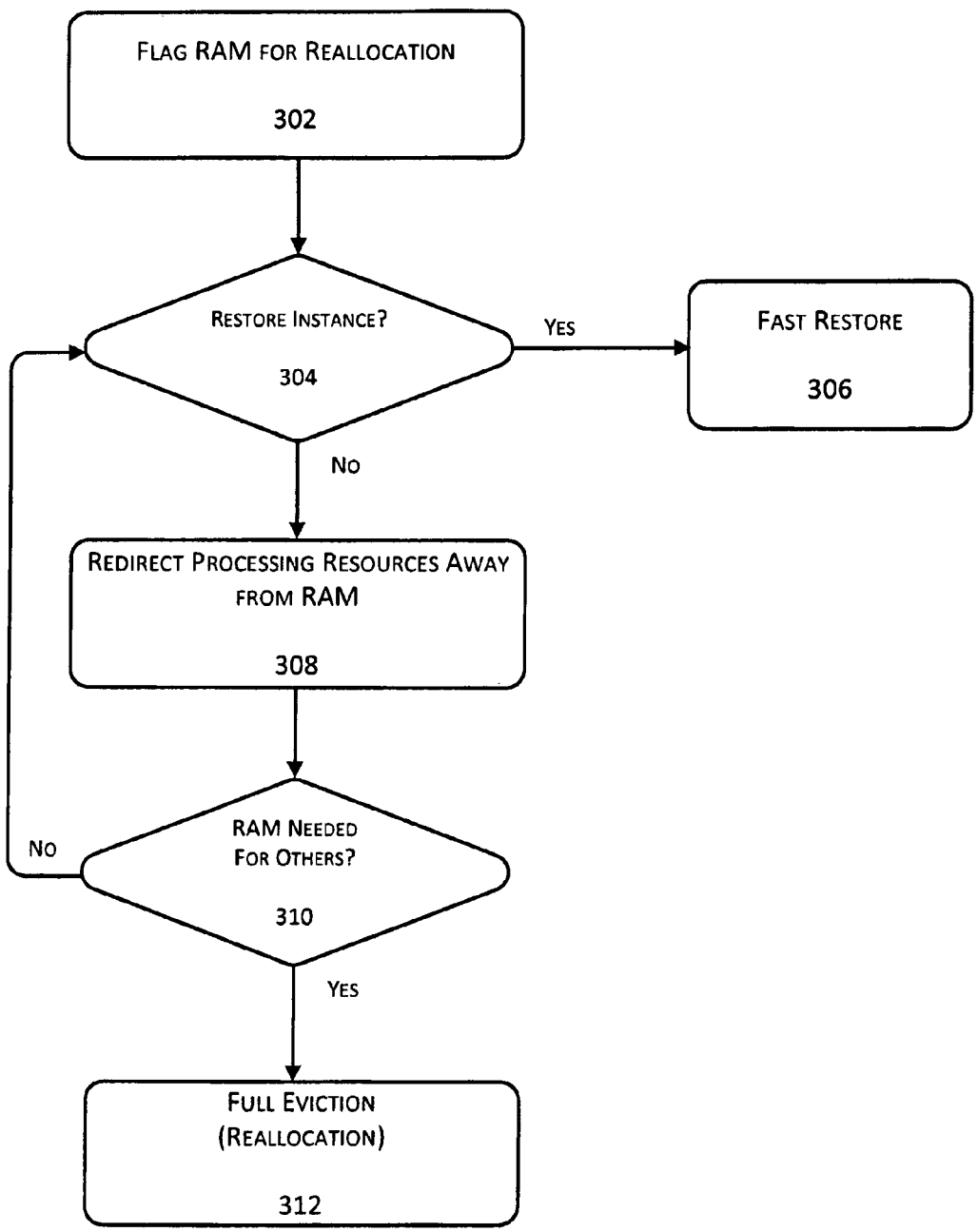
FIG. 3 shows an example processing flow of operations implemented by a virtual machine manager to tier evict instances of executing processes, arranged in accordance with at least some embodiments described herein.

FIG. 3 shows an example processing flow 300 of operations implemented by virtual machine manager 104 to tier evict instances of executing processes, arranged in accordance with at least some embodiments described herein. Processing flow 300 may be implemented by virtual machine manager 104, as stated above, though some embodiments may include virtual machine manager 104 performing various operations in combination with datacenter manager 102. Thus, one or more of the blocks described with regard to processing flow 300 may extend or otherwise be related to one or more blocks described with regard to processing flow 200. Processing flow 300 may include one or more operations, actions, or functions depicted by one or more blocks 302, 304, 306, 308, 310, and 312. Although illustrated as discrete blocks, various blocks, may be divided into additional blocks, combined into fewer blocks, or eliminated, depending on the desired implementation.

Further, as set forth above, configuration 100, and therefore processing flow 300 as well, may pertain to a datacenter, or cloud services platform, of which instances of one or more virtual machines may be rented, leased, or otherwise allocated on a non-permanent time- or task-basis. Processing flow 300 pertains to at least one embodiment of soft eviction by which virtual machine resources for a user who is no longer allocated such resources for one or more of multiple reasons, e.g., lost auction, are revoked incrementally. Processing flow 300 may begin at block 302.

Block 302 (Flag RAM for Reallocation) may refer to virtual machine manager 104 receiving an identification of the subject instance of virtual machines 106, as determined at block 206 (referring to processing flow 200), for which soft eviction is to be implemented. Block 302 may further refer to virtual machine manager 104 flagging or otherwise marking a portion of RAM 108 that corresponds to the subject instance of virtual machines 106 as being eligible for eviction when available RAM storage runs out and new memory is needed. Such flagging or making may be set at the operating system (OS) level or by virtual machine manager 104, within which flags may be maintained. Regardless, in accordance with one or more embodiments of tiered eviction of instances of executing processes, by virtue of such flagging or marking, the flagged or marked portion of RAM 108 may be preserved unless needed by another process, i.e., another instance of virtual machines 106. Processing flow 300 may proceed from block 302 to decision block 304.

Decision block 304 may refer to virtual machine manager 104 determining whether to re-instantiate the subject instance of virtual machines 106. Thus, if virtual machine manager 104 has received an instruction, e.g., from datacenter manager 102, to re-instantiate, processing flow 300 may proceed from decision block 304 to block 306. But if virtual machine manager 104 has not received any instructions for re-Instantiation, processing flow 300 may proceed from decision block 304 to block 308.

Block 306 (Fast Restore) may refer to virtual machine manager 104 receiving an instruction or indication that user rights to the subject instance of virtual machines 106 have been restored, and thus virtual machine manager 104 may further re-allocate processing resources to the subject instance of virtual machines 106 and the flagged or marked portion of RAM 108.

Block 308 (Redirect Processing Resources Away from RAM) may refer to virtual machine manager 104 placing the flagged or marked portion of RAM 108 in a state such that it may be removed or re-allocated for another or new process. Thus, processing resources, e.g., processing time, may be directed away from the flagged or marked portion of RAM 108 and towards new processes, i.e., other instances of virtual machines 106. Since the flagged or marked portion of RAM 108 is no longer allotted processing resources, i.e., is no longer allocated to the subject instance of virtual machines 106, power usage for the instance in flagged or marked portion of RAM 108 is typically lower than that needed for a hard eviction thereof.

Block 308 may further refer to virtual machine manager 104 evicting at least portions of the flagged or marked portion of RAM 108 to local storage included as part of hardware 110 if or when another process from another instance of virtual machines 106 needs at least a portion of RAM 108. In accordance with at least one example, the portions of the flagged or marked portion of RAM 108 may be evicted to page-boundary matched local storage, which may be optionally compressed, thus facilitating efficient storage transfer and rapid decompression and restoration. Accordingly, state of the soft-evicted subject instance of virtual machines 106 may be divided between the flagged or marked portion of RAM 108 and a compressed local storage. Processing flow 300 may proceed from block 308 to decision block 310.

Decision block 310 (RAM Needed for Others?) may refer to virtual machine manger 104 determining whether at least a portion of the flagged or marked portion of RAM 108 is needed by another process. As a non-limiting example, if the flagged or marked portion of RAM 108 is needed by another process and the state of the subject instance of virtual machines 106 is unable to be sufficiently sustained in the compressed local storage, processing flow 300 may proceed from decision block 310 to block 312. But if the flagged or marked portion of RAM 108 is not needed by another process and/or the state of the subject instance of virtual machines 106 is able to be sufficiently sustained in the compressed local storage, processing flow 300 may revert from decision block 310 back to decision block 312.

Block 312 (Full Eviction) may refer to virtual machine manager 104 re-allocating the flagged or marked portion of RAM 180, as well as the compressed local storage, to one or more other processes, i.e., at least one other instance of virtual machines 106.

At decision block 304, virtual machine manager 104 may again determine whether to re-instantiate the subject instance of virtual machines 106.

Accordingly, by processing flow 300, virtual machine manager 104 is able to reduce restore time for the subject instance of virtual machines 106 when user rights thereto have been restored under predetermined conditions by implementing progressive levels of soft eviction.

Figure 4:
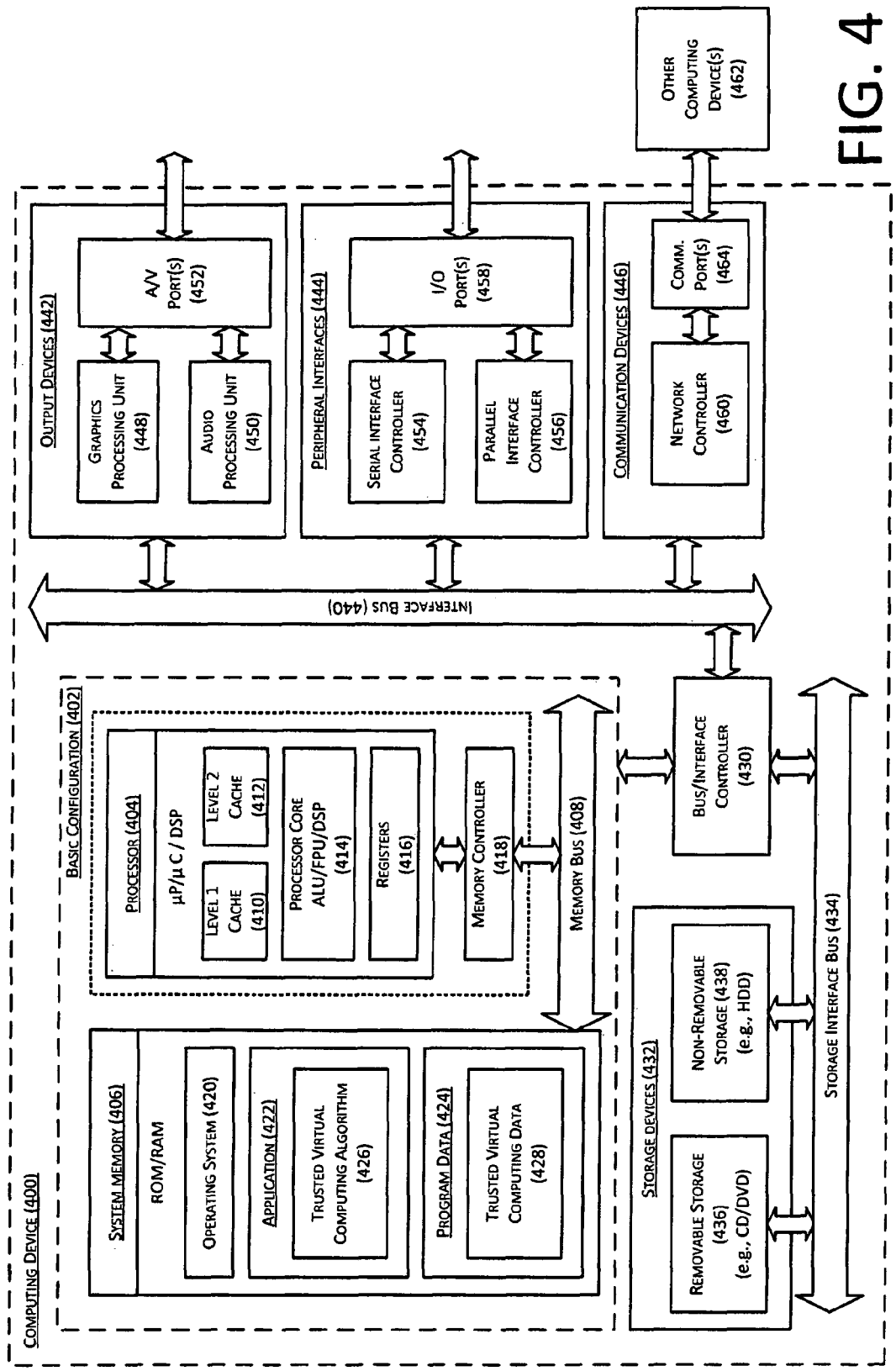
FIG. 4 shows a block diagram illustrating an example computing device by which various example solutions described herein may be implemented, all arranged in accordance with at least some embodiments described herein.

FIG. 4 shows a block diagram illustrating an example computing device by which various example solutions of tiered eviction of instances of executing processes may be implemented, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a trusted virtual computing algorithm 426 that is arranged to perform the functions as described herein including those described with respect to processing flow 300 of FIG. 3 and processing flow 400 of FIG. 4. Program data 424 may include trusted virtual computing data 428 that may be useful for operation with trusted virtual computing algorithm 426 as described herein. Trusted virtual computing data 428 may include threshold data for directing processing resources to or away from any portion of RAM 108. In some embodiments, application 422 may be arranged to operate with program data 424 on operating system 420 such that implementations of tiered eviction of instances may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 544 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium, e.g., a fiber optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be, integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user Interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
    identifying an instance of a virtual machine to evict;
    determining, within a predetermined range of probabilities, that processing on the identified instance of the virtual machine will resume within a predetermined range of time;
    flagging, for reallocation, an allotment of RAM, on which the identified instance of the virtual machine was being processed; and
    softly evicting the identified instance of the virtual machine, including:
        allocating processing resources away from the identified instance of the virtual machine by:
            placing the flagged allotment of RAM in a removable state,
            evicting a portion of the flagged allotment of RAM to page-boundary matched compressed local storage, and
            preserving a non-evicted portion of the flagged allotment of RAM for the identified instance of the virtual machine;
        receiving an instruction to resume the processing on the identified instance of the virtual machine, and
        restoring the processing on the identified instance of the virtual machine.

2. The method of claim 1, wherein the identifying includes receiving an indication that an allotted time for processing on the identified instance has not been extended.

3. The method of claim 2, wherein the allotted time for processing on the identified instance of the virtual machine has not been extended during a completed auction cycle.

4. The method of claim 1, wherein the identifying includes flagging the instance of the virtual machine as an instance to be preserved for at least the predetermined range of time.

5. The method of claim 1, wherein the determining includes determining that a difference between a most recent auction bid for the identified instance of the virtual machine and a winning bid therefor is within an acceptable threshold range.

6. The method of claim 1, wherein the restoring includes:
    re-provisioning the evicted portion of the allotment of RAM back from the local storage; and
    resuming processing on an entirety of the identified instance of the virtual machine.

7. The method of claim 1, wherein the restoring includes reallocating processing resources for the identified instance of the virtual machine.

8. A non-transitory computer-readable medium that stores executable-instructions that, when executed, cause one or more processors to perform operations including:
    identifying an instance of a virtual machine for which processing rights have been lost;
    determining, within a predetermined range of probabilities, that processing on the identified instance of the virtual machine will resume within a predetermined range of time;
    flagging, for reallocation, an allotment of RAM, on which the identified instance of the virtual machine was being processed;
    evicting a portion of the flagged allotment of RAM to page-boundary matched compressed local storage;
    preserving a non-evicted portions of the flagged allotment of RAM for the identified instance of the virtual machine;
    allocating processing resources away from the identified instance of the virtual machine;
    reconfiguring an entirety of the flagged allotment of RAM; and
    restoring the flagged allotment of RAM to full operation for the processing on the identified instance of the virtual machine.

9. The non-transitory computer-readable medium of claim 8, wherein the identifying is initiated upon the processing rights being lost during a datacenter resource transaction.

10. The non-transitory computer-readable medium of claim 9, wherein the datacenter resource transaction is an auction.

11. The non-transitory computer-readable medium of claim 9, wherein factors upon which the determining is based include at least one of usage history attributed to user account to which the identified instance of the virtual machine is assigned or parameters of the datacenter resource transaction in which the processing rights were lost.

12. The non-transitory computer-readable medium of claim 8, wherein the operations further comprise:
    evicting the identified instance from the allotment of RAM if a result of the determining is beyond the predetermined range of probability; and
    activating at least one new instance for processing on the allotment of RAM.

13. The non-transitory computer-readable medium of claim 8, wherein the preserving includes evicting at least portions of the allotment of RAM to a local storage.

14. The non-transitory computer-readable medium of claim 8, wherein the evicted portions of the allotment of RAM are controlled by a virtual machine manager.

15. The non-transitory computer-readable medium of claim 8, wherein the flagging includes rendering the allotment of RAM to be in a removable state.

16. A datacenter comprising a physical processor, the physical processor comprising:
a datacenter manager configured to:
   identify an instance of a virtual machine to evict, and
   determine, within a predetermined range of probabilities, that processing on the identified instance of the virtual machine will resume within a predetermined range of time,
   flagging, for reallocation, an allotment of RAM, on which the identified instance of the virtual machine was being processed; and
a virtual machine manager configured to:
   softly evict the identified instance of the virtual machine by:
      allocating processing resources away from the identified instance of the virtual machine,
         wherein the allocating includes placing the flagged allotment of RAM in a removable state,
      evicting a portion of the flagged allotment of RAM to page-boundary matched compressed local storage,
      preserving a non-evicted portion of the flagged allotment of RAM for the identified instance of the virtual machine,
      receiving an instruction to resume the processing on the identified instance of the virtual machine, and
      restoring the processing on the identified instance of the virtual machine.

17. The datacenter of claim 16, wherein the restoring includes:
   re-provisioning the evicted portion of the allotment of RAM back from the local storage; and
   resuming processing on an entirety of the identified instance of the virtual machine.

18. The datacenter of claim 16, wherein the restoring includes reallocating processing resources for the identified instance of the virtual machine.

* * * * *